United States Patent
Sadhullah et al.

(10) Patent No.: US 10,273,417 B2
(45) Date of Patent: Apr. 30, 2019

(54) PROCESS FOR FLUID CATALYTIC CRACKING

(71) Applicant: INDIAN OIL CORPORATION LTD., Kolkata, West Bengal (IN)

(72) Inventors: Mukthiyar Sadhullah, Faridabad (IN); Satheesh Vetterkunnel Kumaran, Faridabad (IN); Debasis Bhattacharyya, Faridabad (IN); Gadari Saidulu, Faridabad (IN); Somnath Kukade, Faridabad (IN); Brijesh Kumar, Faridabad (IN); Santanam Rajagopal, Faridabad (IN)

(73) Assignee: INDIAN OIL CORPORATION LTD., Kolkata (IN)

( * ) Notice: Subject to any disclaimer, the term of this patent is extended or adjusted under 35 U.S.C. 154(b) by 0 days.

(21) Appl. No.: 15/988,909

(22) Filed: May 24, 2018

(65) Prior Publication Data

US 2018/0264430 A1   Sep. 20, 2018

Related U.S. Application Data

(62) Division of application No. 14/388,217, filed as application No. PCT/IB2012/057684 on Dec. 24, 2012, now Pat. No. 10,130,929.

(30) Foreign Application Priority Data

Mar. 27, 2012   (IN) .............................. 336/KOL/2012

(51) Int. Cl.
  *C10G 11/18*   (2006.01)
  *B01J 8/26*    (2006.01)
  *B01J 8/38*    (2006.01)

(52) U.S. Cl.
  CPC ............. *C10G 11/18* (2013.01); *B01J 8/26* (2013.01); *B01J 8/386* (2013.01); *B01J 2208/0084* (2013.01)

(58) Field of Classification Search
  CPC ...... B01J 19/24; B01J 2208/0084; B01J 8/26; B01J 8/386; C10G 11/10; C10G 11/18
  See application file for complete search history.

(56) References Cited

U.S. PATENT DOCUMENTS 4,385,985 A   5/1983   Gross et al.
4,814,067 A   3/1989   Gartside et al.
(Continued)

FOREIGN PATENT DOCUMENTS

DE   2449346 A1   4/1976

*Primary Examiner* — Renee Robinson
*Assistant Examiner* — Derek N Mueller
(74) *Attorney, Agent, or Firm* — Maschoff Brennan

(57) ABSTRACT

An apparatus which is an integral hardware consisting of an annular downer reactor and a concentric upflow riser regenerator for catalytic cracking of hydrocarbon feed to is disclosed. The annular downer reactor terminates in annular stripper which is also concentric with the regenerator. The regenerator, reactor and stripper are in fluid connection with each other. The apparatus is highly compact and provides efficient contact between circulating catalyst and hydrocarbon feed. The proposed hardware includes a novel radial distributor for providing improved control and radial distribution of catalyst inside the downflow reactor. The radial distributor has equal numbers of stationary and movable parts placed one after another to cover the entire annular opening at the bottom of the regenerated catalyst vessel. The radial distributor is concentric with regenerator and located between the catalyst holding vessel and the reactor. A process for catalytic cracking using the invented apparatus is also disclosed.

16 Claims, 3 Drawing Sheets

(56) References Cited

U.S. PATENT DOCUMENTS

| | | | |
|---|---|---|---|
| 4,919,898 | A | 4/1990 | Gartside et al. |
| 5,098,672 | A | 3/1992 | Gartside et al. |
| 5,296,131 | A | 3/1994 | Raterman |
| 5,468,369 | A | 11/1995 | Muldowney |
| 6,200,534 | B1 | 3/2001 | Ruottu |
| 6,482,312 | B1 | 11/2002 | Gartside et al. |

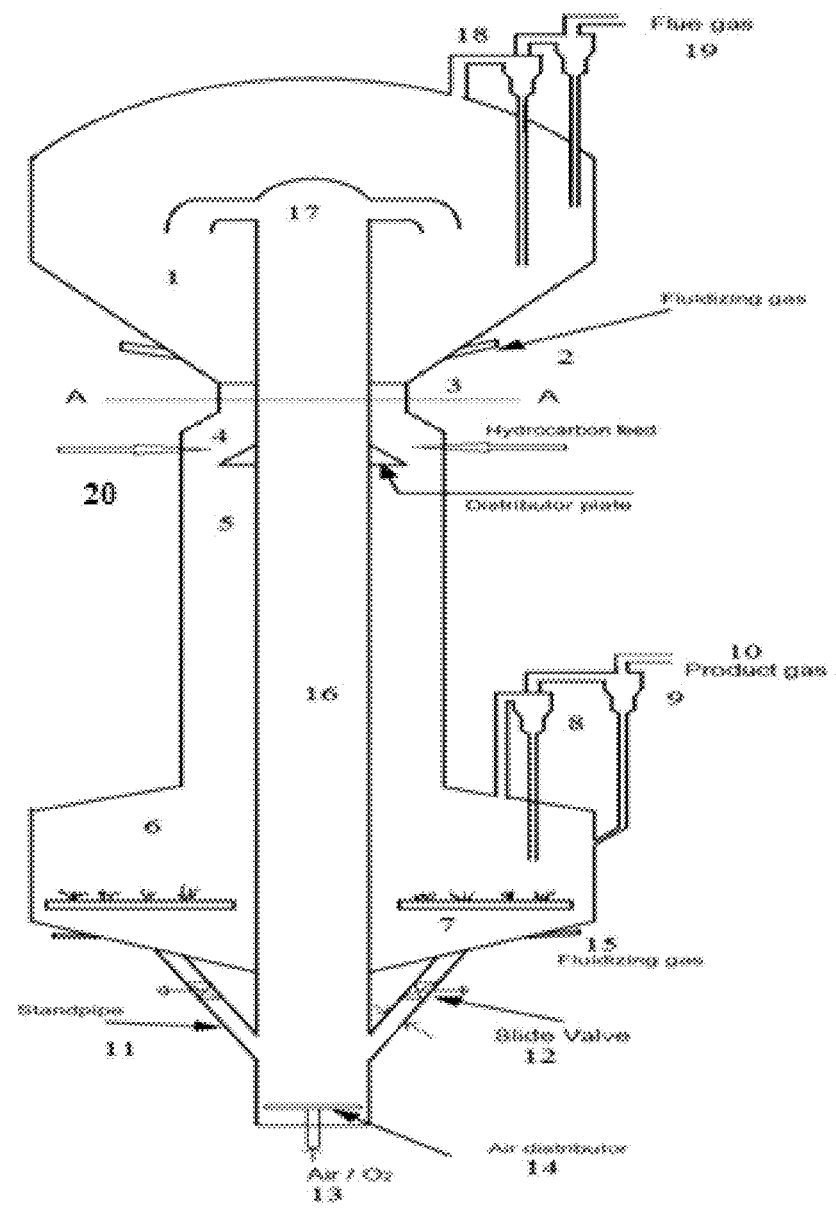
Fig: 1

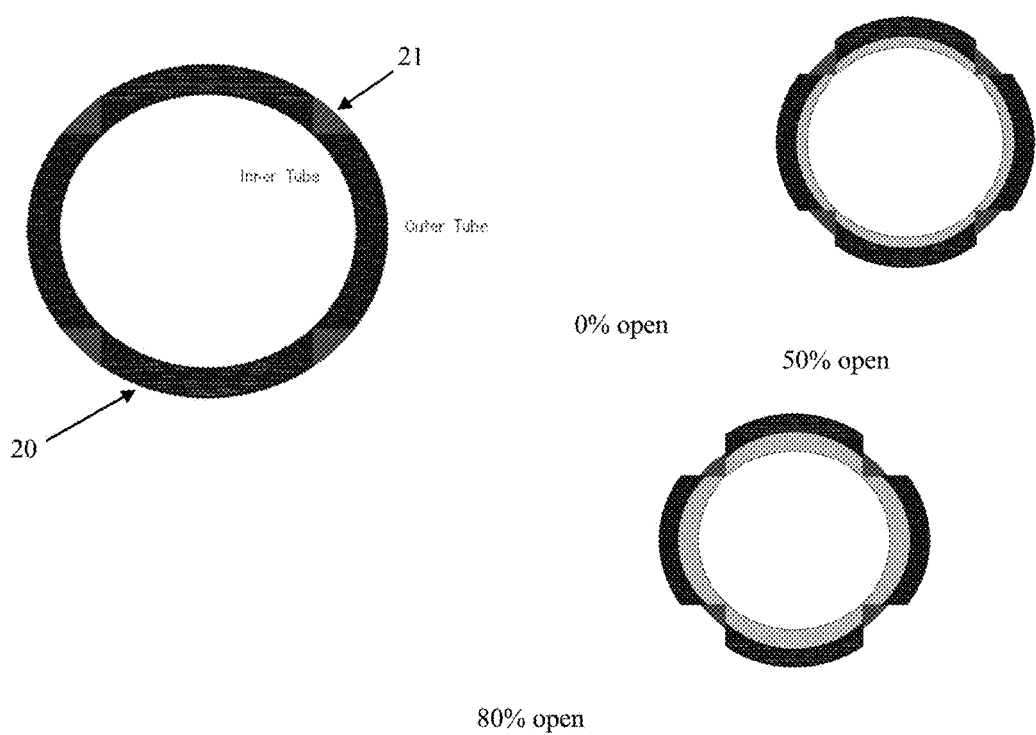
Fig: 2

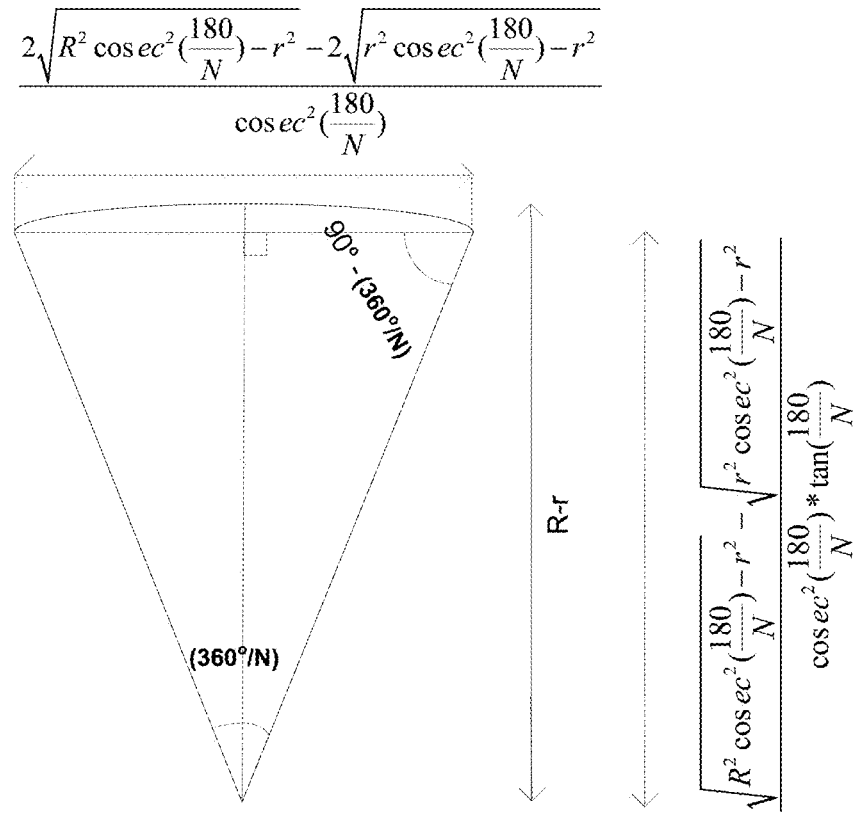
N – Number of stationary / movable parts
R – Outer radius of catalyst distributor
r – Outer radius of riser (inner pipe)
Fig: 3

PROCESS FOR FLUID CATALYTIC CRACKING

CROSS-REFERENCE TO RELATED APPLICATIONS

This application is a divisional of U.S. application Ser. No. 14/388,217, which is the U.S. national stage of International Application No. PCT/IB2012/057684, filed Dec. 24, 2012, which claims priority to Indian Application No. 336/KOL/2012, filed Mar. 27, 2012.

FIELD OF THE INVENTION

The present invention relates to an improved process and an apparatus for catalytic cracking of hydrocarbon feed for production of valuable lighter products. More particularly, it relates to a fluid catalytic cracking process and apparatus employing an annular downer reactor equipped with a novel design of catalyst distributor to provide efficient contact between the circulating catalyst and the hydrocarbon feed.

BACKGROUND AND PRIOR ART OF THE INVENTION

Fluid Catalytic Cracking (FCC) is one of the most important secondary conversion processes to convert the high-boiling, high-molecular weight hydrocarbon fractions to valuable products such as LPG, gasoline, and middle distillates. This process provides flexibility to maximize the product of interest through operation under different modes.

The conversion section of FCC unit consists of riser, reactor, stripper, regenerator and hardware internals. As the price of petroleum crudes has been increasing, more and more emphasis has been given on increasing the efficiency of the catalytic cracking process so that the end product can be more competitively priced. As a result, in the recent past, down flow reactor has been introduced to improve the product selectivity. U.S. Pat. No. 4,385,985 discloses downflow reactor for FCC process claiming it to be better compared to the upflow riser with respect to coke make, distribution of catalyst and decrease in contact time.

In down flow reactor, the catalyst along with the hydrocarbon vapors flow downwards and the slip velocity between the catalyst flow and the hydrocarbon flow is lower than that of the riser reactor resulting in reduced coke formation and higher distillate yield. Although the downflow reactor is said to have superior flow characteristics in comparison to the riser, the main challenge remains the distribution of the catalyst at the initial section of the down flow reactor where it is contacted with hot hydrocarbon feed. Moreover, the radial distribution of the catalyst in a downflow reactor deteriorates with increase in diameter.

Accordingly, Qi.et.al (1990) proposes a configuration where the gas solid flow after the riser is not separated but enters directly to the downer through a sharp 90° bend or smooth connection. Cao.et.al (1994) proposes a fluidized bed feeder designed to Pthe solids at the downer inlet. Solids are fluidized uniformly above the downer inlet and flow through several tubes into the downer.

U.S. Pat. No. 6,200,534 discloses a first circulating fluidized bed reactor surrounded by a second circulating fluidized bed reactor which is concentric to the first. The invention, however, is directed at reducing the footprint/space requirement of the equipment. Many chemical processes involve two separate catalytic or even physical processes. The design of the reactor combines two such processes within the same device, thereby achieving the goal of space saving.

U.S. Pat. No. 5,468,369 discloses a process and apparatus for short contact time fluidized catalytic cracking of heavy oil feed using a reactor with upflow cat:oil vaporizer and downflow reactors. It is claimed that efficient catalyst oil mixing with limited conversion is achieved in the upflow section and the cracking reactions are completed in the downflow section.

U.S. Pat. No. 5,296,131 discloses a concept of falling curtain of catalyst which is claimed to provide maximum exposure of catalyst to oil and difficult to control the flow. This patent describes about the annular curtain of downward flowing solids with flow controlled through a plug valve mechanism placed in the flow path of the catalyst. The option of feed injection with at least one part of the feed is injected toward the bottom through a radial opening under the seat of plug valve has been provided.

U.S. Pat. Nos. 4,814,067, 4,919,898, 5,098,672 and 6,482,312 B1 DIS disclosed by SWEC illustrates the formation of falling annular curtain from rectangular openings provided in a bed pressurized by steam. This patent describes the injection of feed in the direction of valve forming the curtain. This technique suffers from the solids flow control through the pressure difference. As for small pressure difference can cause in wide variation of flow which shall ultimately result in wide variation of selectivity.

From the above analysis of prior art, it is found that there is no disclosure of a compact integral hardware consisting of an annular curtain flow reactor to provide an efficient contact between circulating catalyst and hydrocarbon feed and efficient control of the same. The present invention discloses a process and apparatus for improved contact of catalyst and hydrocarbon feed leading to improved conversion and product selectivity. The apparatus in the current invention mainly comprises of radial distributor for catalyst and an annular downer reactor.

OBJECTS OF THE INVENTION

An object of the invention is to provide an integral hardware consisting of an annular downer reactor and an upflow riser regenerator for catalytic cracking of hydrocarbon feed.

A further object of the invention is to provide apparatus for radial distribution of the catalyst in an annular downer reactor.

Yet another object of the invention is to provide a unique radial catalyst distributor for achieving maximum contact between circulating catalyst.

Yet another object of the invention is to provide efficient contact between circulating catalyst and hydrocarbon feed.

Another object of the invention is to provide a highly compact apparatus.

SUMMARY OF THE INVENTION

The apparatus of the current invention is an integral hardware consisting of an annular downer reactor for catalytic cracking of hydrocarbon feed and an upflow riser regenerator for burning off the coke deposited on the catalyst. The upflow riser regenerator has circular cross section and is surrounded by a concentric downflow reactor which terminates in annular stripper. The regenerator, reactor and stripper are in fluid connection with each other.

This configuration is highly compact and provides efficient contact between circulating catalyst and hydrocarbon feed. The proposed hardware includes a novel radial distributor for providing improved radial distribution of catalyst into the annular downer reactor. The radial distributor has equal numbers of stationary and movable parts placed one after another to cover the entire opening at the inlet of annular downer reactor. It is placed concentric with regenerator and located between the regenerated catalyst holding vessel and the annular downer reactor.

BRIEF DESCRIPTION OF THE ACCOMPANYING DRAWINGS

FIG. 1 is a schematic representation of the apparatus for fluid catalytic cracking according to the invention.

FIG. 2 is a plan view of section A-A in FIG. 1 showing the radial distributor.

FIG. 3 shows the geometric details of the stationary section of the distributor.

DETAILED DESCRIPTION OF THE INVENTION

The proposed apparatus is an integral hardware consisting of an annular downer reactor and an upflow riser regenerator for catalytic cracking of hydrocarbon feed to valuable lighter products. The advantage of this configuration is that its design is highly compact and provides efficient contact between circulating catalyst and hydrocarbon feed. The schematic of the apparatus is given in FIG. 1. The radial distribution of the catalyst in a downflow reactor deteriorates as the diameter increases. To mitigate this, annular curtain flow design with the novel radial distributor for providing improved radial distribution of catalyst into the annular downer reactor is proposed. The schematic of the radial distributor is given in FIG. 2.

The Apparatus

The apparatus according to this invention for fluid catalytic cracking comprising of reactor, regenerator and stripper is described in a sequential manner below. The apparatus is best seen in FIG. 1.

An annular downer reactor (5) is placed concentric to the upflow regenerator (16) with circular cross section which terminates in annular stripper (6) placed at the bottom. The stripper is concentric with the regenerator. The regenerator, reactor and stripper are in fluid connection with each other. Multiple conduits (11) equipped with individual slide valves (12) are provided between stripper and regenerator for flow and control of catalyst from stripper to regenerator. A regenerated catalyst holding vessel (1) is positioned at the top of the annular downer reactor which contains the regenerator termination device (17).

A radial catalyst distributor (3) is placed concentric with the regenerator and is located between catalyst holding vessel (1) and reactor (5). The detailed description of the distributor is provided in the following section.

An angular deflector plate (4) with an angle of inclination varying between 30° to 80° with the horizontal is located below the catalyst distributor, along the outer circumference of regenerator.

Radial Catalyst Distributor

The radial catalyst distributor (3) is designed for efficient distribution and control of catalyst flow into the annular downer reactor.

a. This distributor consists of two types of parts, stationary and moving.

b. The stationary part (21) is a section of annulus and has the shape of circular sector of any particular vertex angle (angle calculated based on the number of stationary part required).

c. The moving part (20) is a section of annulus and has two parallel sides which can move between the edges of two stationary parts.

d. There are equal numbers of stationary and movable parts placed one after another to cover the entire annular opening. For illustration, four stationary parts (pink color) and four moving parts (blue color) are considered in FIG. 2. The vertex angle of the stationary parts in this case is 90°. It is possible to move the rectangular strips in to and fro manner. This will create a variable flow area for the catalyst. The green color shows the opening created for catalyst flow. It also acts as a control valve for regulating the catalyst flow from the regenerated catalyst holding vessel to the annular downer reactor.

The percentage of annular area for catalyst flow increases as the number of stationary and moving parts increase. The catalyst flow area available is minimum when there are two stationary and moving parts and reaches a maximum value for infinite number of stationary and moving parts. The percentage increase of annular area for catalyst flow is less than 0.3% when the stationary and moving parts are more than 6 number. The area of stationary and area of catalyst flow is given in Table 1 below using riser outer diameter of 1.6 m and distributor outer diameter of 1.8 m. It can also be seen that the area for catalyst flow is not only affected with the number of stationary and moving parts of the distributor but also with the variation in outer diameter of the riser regenerator and catalyst distributor. The detail about the calculation on stationary part is given in FIG. 3.

TABLE 1

| No of stationary Divisions | Area of the stationary section (m²) | Percentage area for catalyst flow (%) |
| --- | --- | --- |
| 2 | 0.111 | 79.17 |
| 4 | 0.039 | 92.77 |
| 6 | 0.034 | 93.59 |
| 8 | 0.033 | 93.83 |
| 12 | 0.032 | 94.00 |
| ∞ | 0.031 | 94.12 |

The Process

The regenerated FCC catalyst from the regenerator (16) is collected in regenerated catalyst holding vessel (1) situated at the top of the annular downer reactor (5). The catalyst enters into the annular downer reactor through a radial flow catalyst distributor (3) placed at the bottom of regenerated catalyst vessel (1).

The pre-accelerated catalyst then falls on an angular plate (4) placed around the outer circumference of the upflow regenerator to form a uniform curtain flow. The catalyst flows downwards in the form of curtains through annular downer reactor (5). The hydrocarbon feed is injected into the curtain of catalyst just below the deflector plate using feed injectors (20). These feed injectors are located circumferentially at equidistant locations at outer circumference of annular downer reactor. The catalyst and the vaporized feed moves down through the annular downer reactor (5) and cracking reactions takes place with a very short residence time. The residence time in the downflow reactor may vary between 0.1-2 seconds. The cracked gases along with the spent catalyst enter into the stripper (6) where the products and the catalyst are separated through suitable separation device. The catalyst is stripped using steam in stripper (6) to remove the entrapped hydrocarbons inside the catalyst pores. The entrained catalyst fines are separated from product hydrocarbon vapors and steam by the use of two stage cyclone separators (8, 9) or any suitable separation device. The present invention is not limited to the usage of this separation device. The spent catalyst after steam stripping enters into the upflow riser regenerator (16) through the standpipes (11). The catalyst flow is controlled by a slide valve (12) located on this stand pipe. The catalyst is regenerated in the upflow regenerator operated at the fast fluidized regime to ensure coke on regenerated catalyst below 0.1 wt %. The catalyst residence time provided in the upflow regenerator may vary from 5-60 seconds. The entrained catalyst fines are separated from the flue gas by the use of two stages of cyclone separators (18, 19) or any suitable separation device. The present invention is not limited to the usage of this separation device.

Advantages of the proposed apparatus:

1. The downflow reactor contact efficiency between circulating catalyst and hydrocarbon feed is maximum when the catalyst is dispersed in to the down flow reactor in the form of annular curtains. The proposed apparatus provides an annular curtain without compromising on the central tubular area which is used for regeneration of the spent catalyst.

2. The radial catalyst distributor (3) generates the required uniform circumferential flow into the annular downer reactor.

3. The present apparatus requires less plot area, minimum hardware and catalyst inventory due to its highly compact design.

4. Moreover, this apparatus does away with the long stand pipe operation which is normal in fluid bed catalytic cracking.

Other Embodiments a. The inner upflow riser (16) may be used as lift line and the vessel (1) is used as regenerator, which may be operated either under partial or full combustion mode.

b. The apparatus of the present invention can be used for performing simultaneous pyrolysis and gasification reactions, where the pyrolysis is done in annular downer reactor and the gasification of the resulting char from pyrolysis in upflow riser.

c. The inner upflow riser may be used for cracking reaction, vessel (1) as stripper and the annular downer (5) as regenerator and the stripper (6) as regenerator.

The embodiments of the invention disclosed herein are only illustrative. There can be several other possible embodiments of the invention also fall within the scope of this invention as would be apparent from the practice of the invention. The full scope and spirit of the invention should be derived from the following appended claims.

We claim:

1. A process for catalytic cracking of hydrocarbon, comprising:
    collecting regenerated fluid catalytic cracking (FCC) catalyst from an up-flow regenerator in a catalyst holding vessel of an apparatus adapted for catalytic cracking of hydrocarbon;
    controlling a uniform circumferential catalyst flow into an annular downer reactor of the apparatus by a radial distributor, the annular downer reactor being concentric with an up-flow regenerator of circular cross section;
    allowing the uniform circumferential catalyst flow to fall on an angular deflector plate to form a curtain flow of catalyst in to the annular downer reactor;
    injecting a hydrocarbon feed along with a diluent into the curtain flow of catalyst just below the deflector plate using feed injectors and allowing the catalyst, diluent and the feed to move down through the annular downer reactor;
    recovering hydrocarbon vapors entrapped in catalyst pores by the use of steam in a stripper of the apparatus;
    separating the hydrocarbon vapors and diluent from spent catalyst in the stripper using a separation device; and
    returning the spent catalyst to the regenerator using one or more conduits equipped with individual slide valves.

2. The process as claimed in claim 1, wherein the catalyst has a residence time between 5 to 60 seconds in the up-flow regenerator.

3. The process as claimed in claim 1, wherein the catalyst and the feed have a residence time between 0.1 to 2 second in the annular downer reactor.

4. A process for catalytic cracking of hydrocarbon, comprising:
    using an apparatus for fluid catalytic cracking (FCC) of hydrocarbon feed, the apparatus including:
        (a) an annular downer reactor, concentric with an up-flow regenerator of circular cross section, which terminates in annular stripper, the stripper being concentric with the regenerator and the regenerator, reactor and stripper being in fluid connection with each other;
        (b) a plurality of conduits equipped with individual slide valves positioned between the stripper and the regenerator;
        (c) a catalyst holding vessel positioned at the top of the reactor containing a regenerator termination device;
        (d) a radial catalyst distributor positioned concentric with the up-flow regenerator and located between the regenerated catalyst holding vessel and the annular downer reactor; and
        (e) an angular deflector plate with an angle of inclination varying between 30° to 80° with horizontal and located below the catalyst distributor and along the outer circumference of the up flow regenerator, to generate a curtain flow of catalyst into the annular downer reactor; collecting the regenerated FCC catalyst from the up-flow regenerator in the catalyst holding vessel;
    controlling a uniform circumferential catalyst flow into the annular downer reactor by the radial catalyst distributor;
    allowing a uniform circumferential catalyst flow to fall on the angular deflector plate to form a curtain flow of catalyst in to the annular downer reactor;
    injecting the hydrocarbon feed along with a diluent steam into the curtain flow of catalyst just below the deflector plate using feed injectors and allowing the catalyst, diluent and the feed to move down through the annular downer reactor;
    recovering hydrocarbon vapors entrapped in catalyst pores by use of stream in the stripper;
    separating the hydrocarbon vapors and diluent from the spent catalyst in the stripper using a separation device; and returning the spent catalyst to the regenerator using one or more conduits equipped with individual slide valves.

5. The process as claimed in claim 4, wherein the catalyst has a residence time between 5 to 60 seconds in the up-flow regenerator.

6. The process as claimed in claim 4, wherein the catalyst and the feed have a residence time between 0.1 to 2 second in the annular downer reactor.

7. The process as claimed in claim 4, wherein the radial catalyst distributor controls the uniform circumferential catalyst flow into the reactor.

8. The process as claimed in claim 4, wherein the radial catalyst distributor comprises a plurality of stationary parts and a plurality of moving parts.

9. The process as claimed in claim 8, wherein the number of moving parts is equal to the number of stationary parts.

10. The process as claimed in claim 8, wherein each stationary part has a shape of a circular sector of a particular vertex angle calculated based on the number of stationary parts required.

11. The process as claimed in claim 8, wherein each moving part is a section of annulus with two sides parallel and moving parallel to edges of two adjacent stationary parts.

12. The process as claimed in claim 4, wherein the up-flow regenerator is used as a lift line and the catalyst holding vessel is used as the regenerator, operated either under partial or full combustion mode.

13. The process as claimed in claim 4, wherein the process is used for performing simultaneous pyrolysis and gasification reactions.

14. The process as claimed in claim 13, wherein the pyrolysis is done in the down-flow reactor and gasification of resulting char from the pyrolysis is done in the up-flow regenerator.

15. The process as claimed in claim 4, wherein the up-flow regenerator can be used for cracking reaction, the catalyst holding vessel can be used as the stripper, the down-flow reactor can be used as the regenerator and the stripper can be used as the regenerator.

16. The process as claimed in claim 4, wherein the process provides an annular downer reactor without compromising a central tubular area which is used for regeneration of the spent catalyst.

\* \* \* \* \*